(No Model.)
J. KELLER, Jr.
Hook for Catching Animals and Fowls.
No. 235,154.  Patented Dec. 7, 1880.
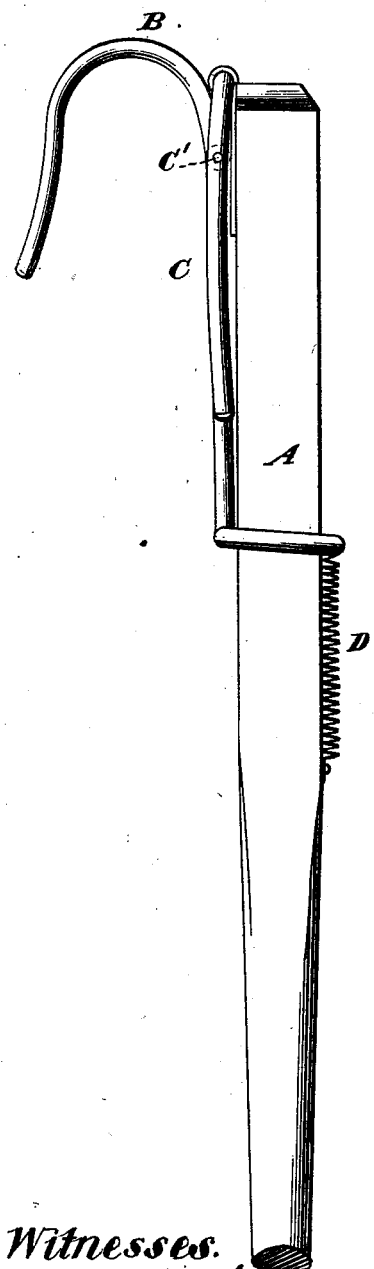
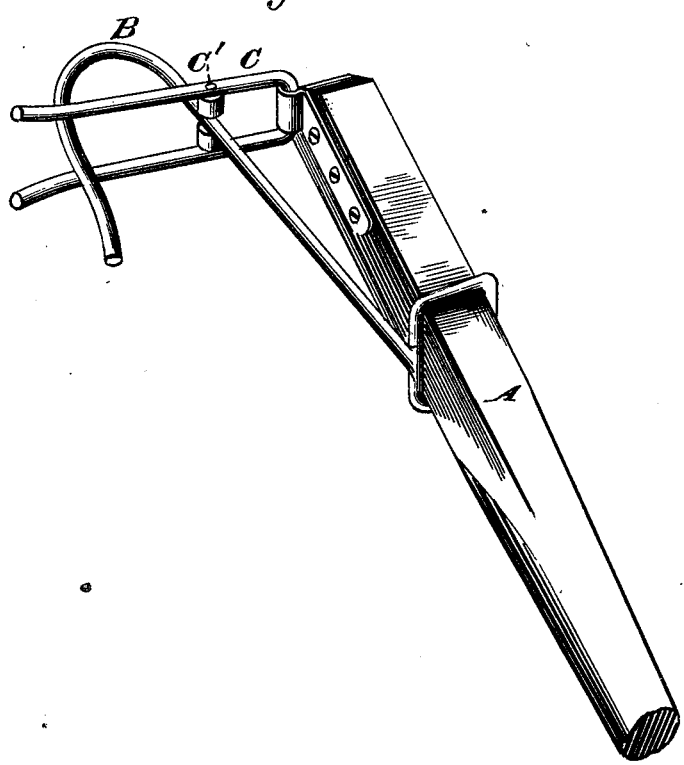
Witnesses.
Inventor.

UNITED STATES PATENT OFFICE.

JACOB KELLER, JR., OF NAPERVILLE, ILLINOIS.

HOOK FOR CATCHING ANIMALS AND FOWLS.

SPECIFICATION forming part of Letters Patent No. 235,154, dated December 7, 1880.

Application filed August 2, 1880. (No model.)

*To all whom it may concern:*

Be it known that I, JACOB KELLER, Jr., a citizen of the United States, residing at Naperville, in the county of Du Page and State of Illinois, have invented certain new and useful Improvements in Hooks for Catching Animals and Fowls; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in hooks for catching and detaining animals and fowls; and the objects of my improvements are, first, to provide a hook which slides upon the pole or rod to which it is attached, so that when it has been passed around the leg of an animal or fowl the leg may be locked or fastened therein by pulling upon the rod; second, to provide a hinged arm or arms, which, when the hook has been passed around the leg of the creature to be caught, will secure the leg therein until released by the operator; and, third, to provide the requisite combinations of devices for producing the effects herein recited. I attain these objects by the devices and combinations thereof illustrated in the accompanying drawings, in which—

Figure 1 is a side view of my apparatus, showing a rod or handle, to which the operating parts are attached, the sliding hook, the hinged arm, and a spring for returning the parts to their normal positions after the hook has been removed from the leg of the animal or fowl. Fig. 2 is a view, partly in perspective, showing the parts in position for retaining the leg in the hook.

Similar letters refer to similar parts throughout the several views.

The method of constructing and operating this implement in catching and securing sheep, pigs, fowls, and other creatures is as follows:

In constructing it there is provided a pole or handle, A, which may be of wood, and of any desired length. Upon this handle, near one of its ends, there is placed a sliding hook, B, the inner end of which is provided with a loop or socket, which embraces the handle A and slides thereon, its outer end being substantially of the form shown in the drawings, or of any form that will adapt it to being readily passed around the leg of the creature to be caught.

For the purpose of securing the leg within the hook, there is hinged to the end of handle A an arm, C, which, by preference, consists of two parts, as shown in Fig. 2, but which may consist of a single arm, and be made to perform its functions satisfactorily.

The arm or arms above alluded to are pivoted at C′ to the hook B, so that as said hook is passed around the leg of the creature to be caught, and the handle A is pulled to the rearward, the parts will assume the positions shown in Fig. 2, and thus secure it thereon, and prevent the escape of the animal or fowl. For returning the hook and the arm or arms to their proper positions for use after the hook has been removed from the leg, there is provided a spring, D, one end of which is secured to the handle A by means of a pin or screw, while its opposite end is attached to the hook B, it being so arranged that as such hook slides forward upon the handle the spring will be elongated, and when the hook has been removed from the leg it will contract and bring the parts into position for use, as shown in Fig. 1.

The method of operation is as follows: When it becomes desirable to catch and detain any one sheep of a flock, or any one pig or hog of a herd, or a fowl, the implement is taken in the hand of a person, who approaches the creature sufficiently near to pass the hook around its leg, when, by pulling the handle rearward, the parts will assume the positions shown in Fig. 2, and the leg will be locked or secured in the hook, and the animal detained until otherwise disposed of.

Having thus described my invention, what I claim, and desire to secure by Letters Patent, is—

The combination of the rod or handle A, the sliding hook B, the bifurcated arm C, pivoted to the hook and hinged to the handle at or near its end, and the spring D, the parts being constructed and arranged for joint operation substantially as set forth.

In testimony whereof I affix my signature in presence of two witnesses.

JACOB KELLER, JR.

Witnesses:
H. H. GOODRICH,
WM. KING.